US009794750B1

(12) United States Patent
Bitra et al.

(10) Patent No.: US 9,794,750 B1
(45) Date of Patent: Oct. 17, 2017

(54) VENUE-SPECIFIC WIRELESS ACCESS POINT LOCATION INFORMATION CREATION AND DISTRIBUTION

(71) Applicant: QUALCOMM Incorporated, San Diego, CA (US)

(72) Inventors: Suresh Kumar Bitra, Mangalagiri (IN); Meghna Agrawal, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/097,190

(22) Filed: Apr. 12, 2016

(51) Int. Cl.
*H04W 24/00* (2009.01)
*H04W 4/02* (2009.01)
*H04W 48/16* (2009.01)
*H04L 12/26* (2006.01)

(52) U.S. Cl.
CPC ............ *H04W 4/023* (2013.01); *H04L 43/16* (2013.01); *H04W 48/16* (2013.01)

(58) Field of Classification Search
CPC . H04W 64/00; H04W 64/003; H04W 64/006; H04W 48/08; H04W 48/16; H04W 4/02
USPC ................ 455/456.1, 456.2, 456.5, 456.6
See application file for complete search history.

(56) References Cited

U.S. PATENT DOCUMENTS

| 2013/0162481 A1* | 6/2013 | Parvizi | G01S 3/023 |
| | | | 342/452 |
| 2015/0126217 A1 | 5/2015 | Do et al. | |
| 2015/0201305 A1* | 7/2015 | Edge | H04W 4/021 |
| | | | 455/456.3 |

FOREIGN PATENT DOCUMENTS

WO    2016032674 A1    3/2016

OTHER PUBLICATIONS

International Search Report and Written Opinion—PCT/US2017/019127—ISA/EPO—May 19, 2017.

* cited by examiner

*Primary Examiner* — Temica M Beamer
(74) *Attorney, Agent, or Firm* — Kilpatrick Townsend & Stockton, LLP

(57) ABSTRACT

Crowdsourced information may be used to associate APs with a venue and creating a venue-specific information file based on this association. This can enable the mobile device to download a single venue information file for a venue in which the mobile device may stay for an extended period of time, which may alleviate or eliminate the need to download additional AP location information while at the venue.

28 Claims, 10 Drawing Sheets

VENUE-SPECIFIC WIRELESS ACCESS POINT LOCATION INFORMATION CREATION AND DISTRIBUTION

BACKGROUND

The position of a mobile device, such as a mobile phone, tablet computer, personal media player, or other wireless electronic device can be estimated based on wireless signals transmitted by wireless access points (APs) and received by the mobile device. If the mobile device knows the locations of the APs, the mobile device can estimate the position by using measurements of the wireless signals to calculate the distance or range between the mobile device and each AP. If the mobile device does not have the locations of the APs stored locally, the data can be requested from a server and downloaded.

For organizational purposes, APs are typically grouped into "tiles" representing geographical regions, often arranged in a predetermined grid without consideration of what venues these tiles may cover. Thus, in response to a request for the locations of the APs, a server may provide an entire tile, which may include the information of many APs that are not within a venue at which the mobile device is located. Because mobile devices often have limited memory allocated to AP location data storage, it can be a drain on power consumption for the mobile device at a venue that may overlap a plurality of tiles, because it may need to frequently download and re-download tile information as the mobile device moves between tiles, much of which is inapplicable to the venue.

SUMMARY

Techniques disclosed herein are directed toward using crowdsourced information to associate APs with a venue and creating a venue-specific information file based on this association. This can enable the mobile device to download a single venue information file for a venue in which the mobile device may stay for an extended period of time, which may alleviate or eliminate the need to download additional AP location information while at the venue.

An example server for determining and distributing venue-specific wireless access point location data via crowdsourcing, according to the description, comprises a communication interface, a memory, and a processing unit communicatively coupled with the communication interface and the memory. The processing unit is configured to cause the server to receive, via the communication interface, information from one or more mobile devices indicative of one or more locations of the one or more mobile devices within a venue, and an identity of each of a plurality of wireless access points detectable by the one or more mobile devices while at the one or more locations within the venue. A threshold number of the plurality of wireless access points are associated with the venue, or at least part of the identity of each of the plurality of wireless access points is the same for all of the plurality of wireless access points. The processing unit is configured to cause the server to create a venue information file, based at least in part on the information received from the one or more mobile devices, where the venue information file includes information regarding at least one wireless access point of the plurality of wireless access points. The processing unit is configured to cause the server to send the venue information file via the communication interface.

An example mobile device, according to the disclosure, comprises a wireless communication interface, a memory, and a processing unit communicatively coupled with the wireless communication interface and the memory. The processing unit is configured to cause the mobile device to detect, with the wireless communication interface, a plurality of wireless access points at a location within a venue, where a threshold number of the plurality of wireless access points are associated with the venue or at least part of an identity of each of the plurality of wireless access points is the same for all of the plurality of wireless access points. The processing unit is configured to cause the mobile device to, in response to detecting the plurality of wireless access points, send, via the wireless communication interface to a server, information indicative of the identity of at least one of the plurality of wireless access points, and the location within the venue at which the plurality of wireless access points were detected. The processing unit is configured to cause the mobile device to further send, via the wireless communication interface to the server an indication of an identity of the venue with which the threshold number of the plurality of wireless access points are associated, or the at least part of the identity of each of the plurality of wireless access points that is the same for all of the plurality of wireless access points, or both.

An example method of determining and distributing venue-specific wireless access point location data via crowdsourcing, according to the disclosure, comprises receiving, via a communication interface, information from one or more mobile devices indicative of one or more locations of the one or more mobile devices within a venue; and an identity of each of a plurality of wireless access points detectable by the one or more mobile devices while at the one or more locations within the venue, where a threshold number of the plurality of wireless access points are associated with the venue, or at least part of the identity of each of the plurality of wireless access points is the same for all of the plurality of wireless access points. The method further comprises creating, with a processing unit, a venue information file, based at least in part on the information received from the one or more mobile devices, where the venue information file includes information regarding at least one wireless access point of the plurality of wireless access points. The method further comprises sending the venue information file via the communication interface.

An example method of providing information for a determination of venue-specific wireless access point location data, according to the disclosure, comprises detecting, with a wireless communication interface, a plurality of wireless access points at a location within a venue, where a threshold number of the plurality of wireless access points are associated with the venue, or at least part of an identity of each of the plurality of wireless access points is the same for all of the plurality of wireless access points. The method further comprises in response to detecting the plurality of wireless access points, sending, via the wireless communication interface to a server, information indicative of the identity of at least one of the plurality of wireless access points, and the location within the venue at which the plurality of wireless access points were detected. The method further comprises further sending, via the wireless communication interface to the server an indication of an identity of the venue with which the threshold number of the plurality of wireless access points are associated, or the at least part of the identity of each of the plurality of wireless access points that is the same for all of the plurality of wireless access points, or both.

An example computer-readable medium, according to the description, includes instructions embedded thereon for causing a computer to determine and distribute venue-specific wireless access point location data via crowdsourcing, the instructions comprising computer code for receiving information from one or more mobile devices indicative of one or more locations of the one or more mobile devices within a venue and an identity of each of a plurality of wireless access points detectable by the one or more mobile devices while at the one or more locations within the venue, where a threshold number of the plurality of wireless access points are associated with the venue, or at least part of the identity of each of the plurality of wireless access points is the same for all of the plurality of wireless access points. The instructions further comprising computer code for creating, with a processing unit, a venue information file, based at least in part on the information received from the one or more mobile devices, where the venue information file includes information regarding at least one wireless access point of the plurality of wireless access points. The instructions further comprising computer code for sending the venue information file via the communication interface.

An example computer-readable medium, according to the description, includes instructions embedded thereon for causing a computer to provide information for a determination of venue-specific wireless access point location data, the instructions comprising computer code for detecting a plurality of wireless access points at a location within a venue, where a threshold number of the plurality of wireless access points are associated with the venue or at least part of an identity of each of the plurality of wireless access points is the same for all of the plurality of wireless access points. The instructions further comprising computer code for, in response to detecting the plurality of wireless access points, sending, to a server, information indicative of the identity of at least one of the plurality of wireless access points, and the location within the venue at which the plurality of wireless access points were detected. The instructions further comprising computer code for further sending, to the server, an indication of an identity of the venue with which the threshold number of the plurality of wireless access points are associated, or the at least part of the identity of each of the plurality of wireless access points that is the same for all of the plurality of wireless access points, or both.

An example apparatus, according to the disclosure, comprises means for receiving information from one or more mobile devices indicative of one or more locations of the one or more mobile devices within a venue and an identity of each of a plurality of wireless access points detectable by the one or more mobile devices while at the one or more locations within the venue, where a threshold number of the plurality of wireless access points are associated with the venue, or at least part of the identity of each of the plurality of wireless access points is the same for all of the plurality of wireless access points. The apparatus further comprises means for creating a venue information file, based at least in part on the information received from the one or more mobile devices, where the venue information file includes information regarding at least one wireless access point of the plurality of wireless access points. The apparatus further comprises means for sending the venue information file.

An example apparatus, according to the disclosure, comprises means for detecting a plurality of wireless access points at a location within a venue, where a threshold number of the plurality of wireless access points are associated with the venue or at least part of an identity of each of the plurality of wireless access points is the same for all of the plurality of wireless access points. The apparatus further comprises means for, in response to detecting the plurality of wireless access points, sending, to a server, information indicative of the identity of at least one of the plurality of wireless access points, and the location within the venue at which the plurality of wireless access points were detected. The apparatus further comprises means for further sending, to the server an indication of an identity of the venue with which the threshold number of the plurality of wireless access points are associated, or the at least part of the identity of each of the plurality of wireless access points that is the same for all of the plurality of wireless access points, or both.

Items and/or techniques described herein may provide one or more of the following capabilities, as well as other capabilities not mentioned. Techniques can provide for reduced bandwidth and/or memory usage for AP location information. These techniques may also help prolong the battery life of mobile devices. These and other advantages and features are described in more detail in conjunction with the text below and attached figures.

BRIEF DESCRIPTION OF THE DRAWINGS

An understanding of the nature and advantages of various embodiments may be realized by reference to the following figures.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

A wireless wide area network (WWAN) can utilize mobile telecommunication cellular network and/or other technology to enable mobile devices such as mobile phones, tablets, mobile gaming systems, personal media players, notebook computers, and similar electronic devices to transmit and receive data over a large geographical region. The position of a mobile device in such a network can be determined using various means, including satellite positioning system (SPS) data received by the mobile device, trilateration for signals received at antennas (e.g., cell towers), and more. The determination of a mobile device has become increasingly important with the use of positioning applications by mobile devices, governmental requirements for tracking mobile devices (e.g., E911), and the like.

One effective means for estimating the position of a mobile device is by detecting, with the mobile device, wireless signals transmitted by wireless access points (APs). APs may utilize Wi-Fi and/or other wireless technologies to communicate wirelessly. If the mobile device knows the locations of the APs (which, because they are typically immobile, can be cataloged in an almanac and provided, in portions, to the mobile device), the mobile device can estimate the position by using measurements of the wireless signals to calculate the distance or range between the mobile device and each AP. If the mobile device does not have the locations of the APs stored locally, the data can be requested from a server and downloaded.

Figure 2A:
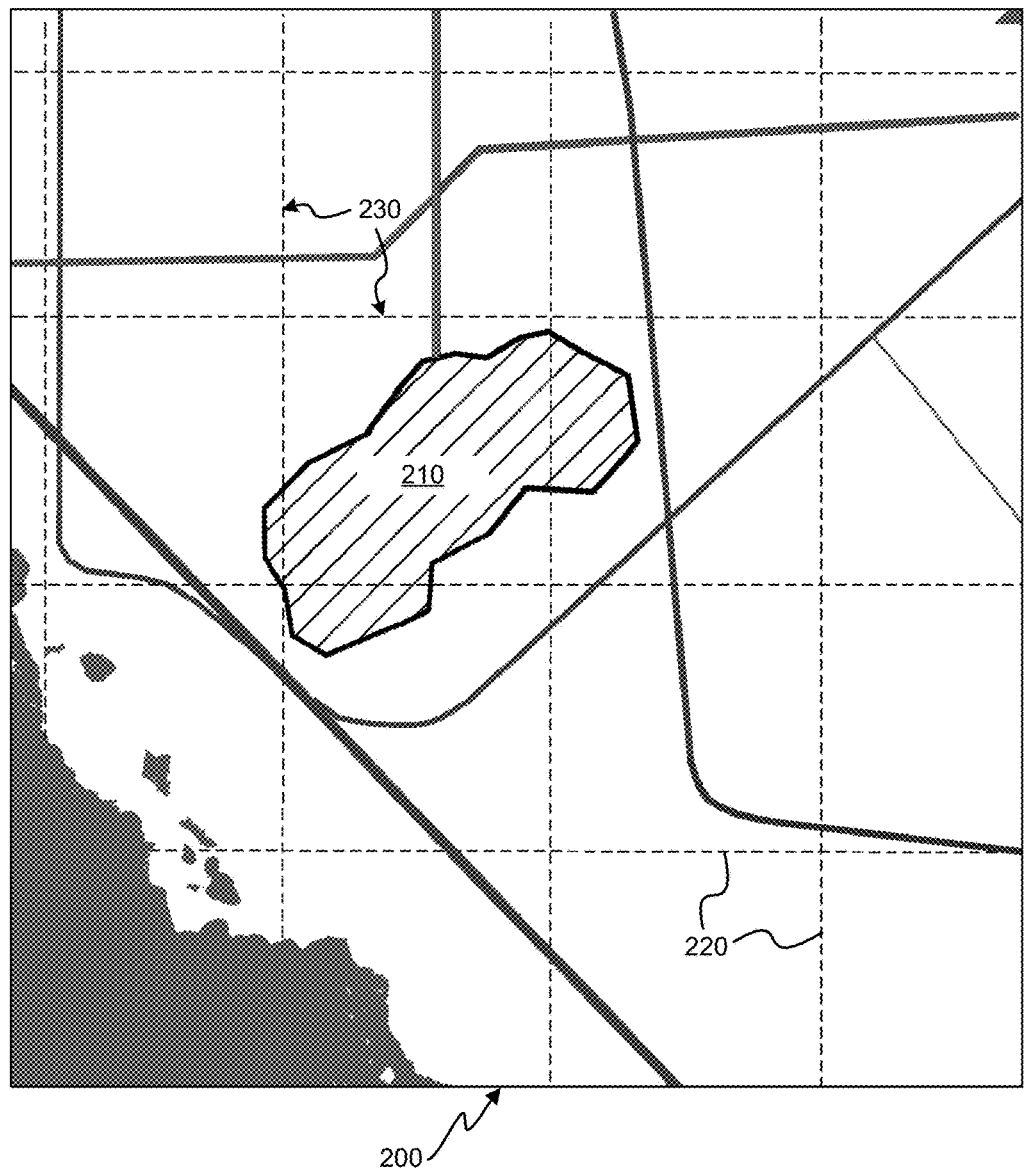
FIGS. 2A and 2B are maps of an example area in which a positioning system, such as the positioning system of FIG. 1, may operate.
Figure 2B:
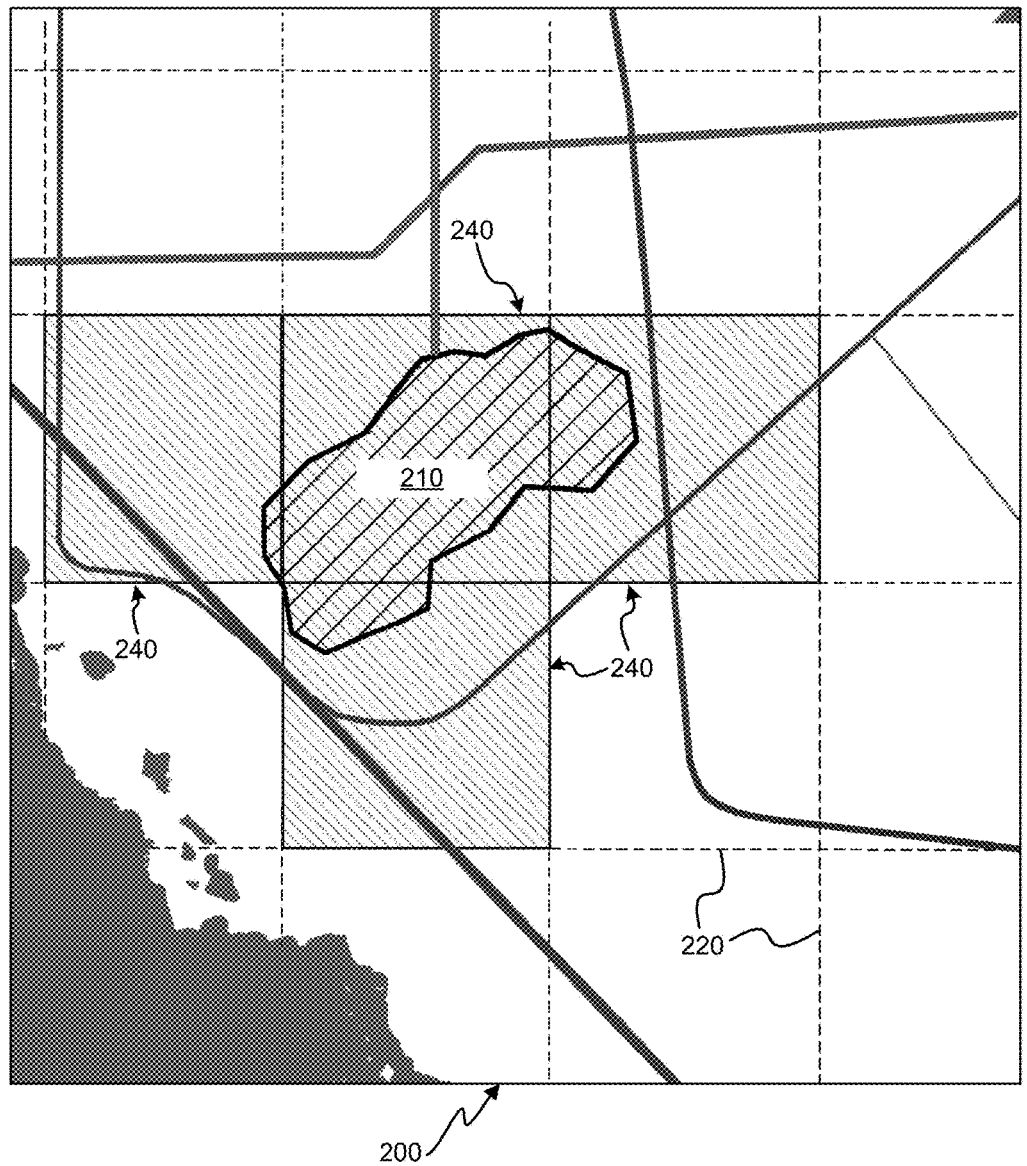

Depending on where a mobile device may be located, there may be many APs in a nearby area. To help organize the data for the APs and reduce the number of requests, the APs may be grouped into "tiles" based on their geographical location. A tile can represent a certain geographical area in which a plurality of APs is located. (It can be noted that, as used herein, the terms "tile" and "tile information" may be used interchangeably, and may refer both to a geographical region as shown in FIGS. 2A and 2B or information related thereto, including location data for APs located therein and/or nearby.) The mobile device may request and download tile information for tiles from the server, rather than download data for each AP individually. However, as previously noted and explained in more detail below, tiles are typically formed by splitting a large geographical area into a grid of smaller geographical regions (or tiles) (e.g., 1 km×1 km) without consideration of what venue (e.g., zoo, park, museum, stadium, amusement park, university, etc.) is at a given location. Because of this, a mobile device at a venue that spans a plurality of tiles may need to frequently download and re-download tile information as the mobile device crosses from one tile to the next, because there is often a limited amount of memory allocated for AP location information storage. As such, it can be a drain on power consumption for the mobile device (which may need to frequently download tiles because of limited memory resources) at a venue that may overlap a plurality of tiles.

Techniques disclosed herein can alleviate these and other issues by utilizing crowdsourcing to associate APs with a venue and creating a venue-specific information file based on this association. The information in this file may comprise information similar to that typically included in a traditional tile. As such, this venue-specific information file may be, in essence, a tile representing a geographical region having boundaries at or near the actual geographical boundaries of the venue. The creation of a venue-specific information file can thereby enable a mobile device to download a single file for a venue (in which the mobile device may stay for an extended period of time) without incurring the problems of downloading and re-downloading traditional tiles as described above.

Figure 1:
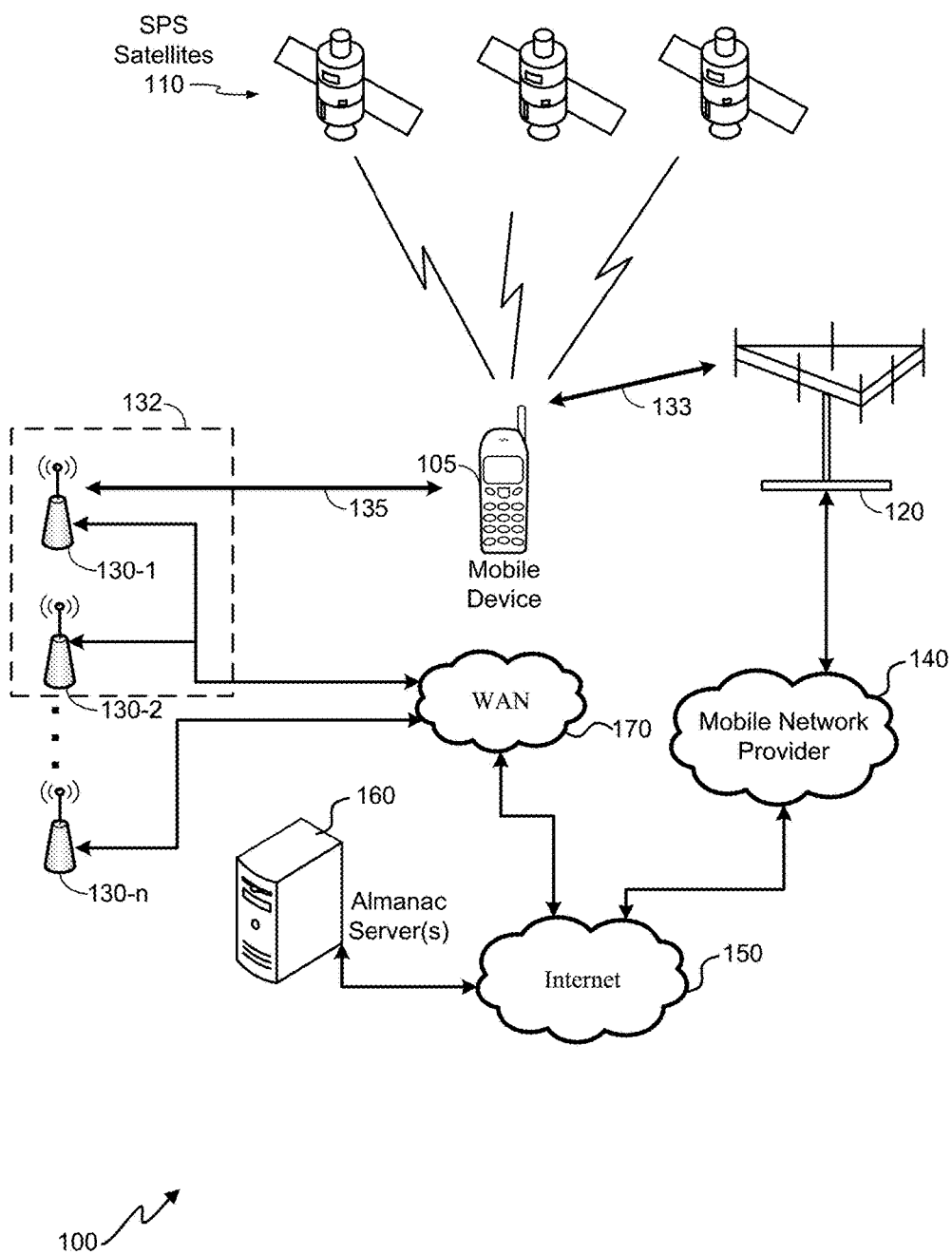
FIG. 1 is a simplified illustration of a positioning system, according to an embodiment.

FIG. 1 is a simplified illustration of a positioning system 100, according to one embodiment, which can implement the techniques described herein. Here, a mobile device 105 and/or other components of the positioning system 100 can process measurements and/or other data points to determine the position of the mobile device 105. The positioning system can include a mobile device 105, satellite positioning service (SPS) satellites 110, base transceiver station(s) 120, mobile network provider 140, access point(s) 130, almanac server(s) 160, wireless area network (WAN) 170, and the Internet 150. It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may be utilized in the positioning system 100. Similarly, the positioning system 100 may include many antennas 120 and/or a larger or smaller number of APs 130. Connections between illustrated components may include additional (intermediary) components, direct or indirect connections, and/or additional networks. Furthermore, components may be rearranged, combined, separated, substituted, and/or omitted, depending on desired functionality. A person of ordinary skill in the art will recognize many modifications to the components illustrated.

The antenna 120 is communicatively coupled to the mobile network provider 140 (e.g., a cellular network), which may be communicatively coupled with the Internet 150. The almanac server(s) 160 can also be communicatively coupled with the Internet 150. Thus, the mobile device 105 can communicate information with the almanac server(s) 160, for example, by accessing the Internet 150 via the antenna 120 using a first communication link 133. Additionally or alternatively, because an AP 130 and WAN 170 also may be communicatively coupled with the Internet 150, the mobile device 105 may communicate with the almanac server(s) 160 using a second communication link 135.

As shown in FIG. 1, there may be a plurality of APs 130, some or all of which may be detected by the mobile device 105. Moreover, as discussed in more detail below, some APs (130-1 and 130-2) may be associated with a venue (as indicated by dashed line 132). Other APs 130-n may not. Although FIG. 1 shows that the mobile device 105 having a communication link (the second communication link 135) with only one AP 130-1, other configurations or embodiments may allow for multiple communication links with multiple APs 130, in and/or outside of the venue. Additionally or alternatively, the mobile device 105 may establish communication links with different APs 130 at different times.

Depending on desired functionality, a location of the mobile device 105 can be determined in any of a variety of ways, by the mobile device and/or other devices in communication with the mobile device, which may be situation dependent. In some embodiments, the almanac server(s) and/or other devices (not shown) remote to the mobile device 105, for example, can be used to implement positioning methods for supporting the positioning of a mobile device 105, typically referred to as a target mobile device, target device, or target. These positioning methods may comprise, for example, measurements by a mobile device of signals transmitted by SPS satellites 110, antennas 120 belonging to a wireless cellular network (e.g., the mobile network provider 140), a access points (APs) 130, and the like.

In addition (or as an alternative) to these position-determination methods, techniques described herein can utilize one or more almanac servers 160 that receive "crowd-sourced" information from one or more mobile devices 105 regarding one or more AP(s) 130 and, in accordance with techniques described herein, associate one or more AP(s) 130 with a venue. The association of APs with a certain venue can be done using crowdsourced information from mobile devices 105 at the venue. For instance, while at the venue, a mobile device 105 can send location information (e.g., coordinates and/or venue identification information) to the almanac server(s) 160, along with a cluster of "visible" APs (i.e., APs detected by the mobile device 105 at a given time and/or location within the venue) to be tagged as venue-related APs. The cluster can include, for example, all visible APs (regardless of whether they are associated with the venue), all visible APs when a threshold number of the visible APs are already associated with the venue, all visible APs broadcasting the same or similar Service Set Identifier (SSID) or other identity, and the like. Additional details concerning this process are provided below.

For its part, the almanac server(s) 160 can gather information from a plurality of mobile devices 105 at the venue and create a venue information file that includes the APs 130 identified by the mobile devices 105 as being associated with the venue. In some embodiments, the almanac server(s) 160 may wait to add an AP 130 to a venue information file until the AP 130 has been identified by a threshold number of mobile devices 105 and/or by a threshold number of received crowdsourcing information.

The almanac server(s) 160 may determine the venue name and/or physical boundaries based on map data (received, for example, from the Geographic Information System (GIS) and/or other databases). In some embodiments, mobile devices may include received signal strength indication (RSSI) and/or round trip propagation time (RTT) measurements for each AP to enable the almanac server(s) 160 to determine whether the AP is located at the venue and should be included in the tile. In some embodiments, the mobile device 105 may make this determination.

According to some embodiments, the almanac server(s) 160 can establish the boundary of the venue using APs. This can be done in a variety of ways. In some embodiments, for example, for each venue tile, the almanac server(s) 160 can tag APs with information, indicating whether the APs are in-venue APs or boundary APs. An in-venue APs may be determined as an AP near mobile device (e.g., as determined by RSSI and/or RTT measurements) with a known location inside the venue. Additionally or alternatively, where an AP is surrounded by indoor APs, then it may be determined to be an in-venue AP. An AP that is observed by a mobile device with in-venue APs but does not otherwise meet the criteria of in-venue APs may be determined to be a boundary AP. Where an AP is detected by a mobile device with only boundary APs (and not in-venue APs), it may be determined to be an out-of-venue AP. (And thereby may be removed from a tile by the almanac server(s) 160, if it was included previously therein.) Additionally or alternatively, the almanac server(s) 160 may determine in-venue and boundary APs, by utilizing location information of the APs as provided by mobile devices, in conjunction with a map of the venue. In some instances, the almanac server(s) 160 may also generate its own map by using APs tagged as in-venue APs. Such a map may be provided to a client, depending on desired functionality.

When entering the venue, the mobile device 105 may request the venue information file from the almanac server(s) 160. Where an AP 130 is available for data communication and is associated with the venue in which it is located, the mobile device 105 may download the venue information file via the AP 130. In some embodiments, the mobile device 105 may pre-download the venue information file if the mobile device 105 determines (e.g., from user input, a navigation application, etc.) it will be going to the venue. In some embodiments, the almanac server(s) 160 and/or previously-downloaded tiles on the mobile device 105 may indicate where one or more entrances may be for the venue. This can help the mobile device 105 to determine when to download the tile for the venue. For example, embodiments may cause a mobile device to download the tile for the venue when the mobile device is determined to be within a threshold distance of an entrance. Otherwise, the tile for the venue may not be downloaded. This can prevent the mobile device from downloading the tile for the venue in instances in which the mobile device passes near the venue but does not enter it. In some embodiments, the almanac server(s) 160 may provide information regarding APs at or near the entrance of a venue to a mobile device 105. When the mobile device 105 detects one or more of these APs, and/or determines is within a threshold distance from one or more of these APs, it may then request to download the tile for the venue. Where the AP density for a venue is low (resulting in more available memory for AP location information on a mobile device 105), the almanac server(s) 160 may send tiles (or similar AP location information) of neighboring locations and may indicate areas in the venue which no AP coverage is available. In some embodiments, the mobile device 105 may use this coverage information to automatically disable Wi-Fi scans for locationing purposes when in an area identified as having no coverage, and Wi-Fi scans on when leaving that area.

FIGS. 2A and 2B are maps of an example area 200 in which a positioning system, such as the positioning system 100 of FIG. 1, may operate to provide AP location information regarding a venue 210 using a grid of tiles.

FIG. 2A illustrates how tiles may be formed by dividing the area 200 by gridlines 220 (for simplicity, labels have been omitted for most gridlines 220) into several square-shaped tiles 230 (again, for simplicity, labels have been omitted for most tiles 230), representing regions of the area 200 by which APs (not shown in FIG. 2A) may be grouped. The number of APs in each tile 230 may vary, depending on the size and/or shape of the tile (which may also vary), AP density and/or distribution, and the like. In some embodiments, some tiles 230 may include only a few APs, while others have hundreds, thousands, or more.

FIG. 2B is a map, similar to 2A, but with the tiles 240 overlapping the venue 210 shaded to help illustrate the inefficiencies of tiles in conveying AP location information for a venue, as described earlier. In particular, although the total area of the venue 210 in this example is roughly the size of a single tile, it overlaps with the four shaded tiles 240. Thus, when a person enters venue 210 and travels therein, the person's mobile device may need to download four different tiles from an almanac server to receive AP location information for APs within the venue 210. Moreover, if the amount of memory allocated on the person's mobile device is less than the amount of memory required to store all four tiles (e.g., three or fewer, in the example shown in FIG. 2B), then the mobile device may need to repeatedly download and re-download tiles as the person travels within the venue. Moreover, because the shaded tiles 240 include AP location information for a large amount of area outside the venue 210, it is likely that the downloaded tile information will include location information for APs that are not located in or nearby the venue 210. This information, therefore, may not be useful to a mobile device located at the venue 210.

Figure 3:
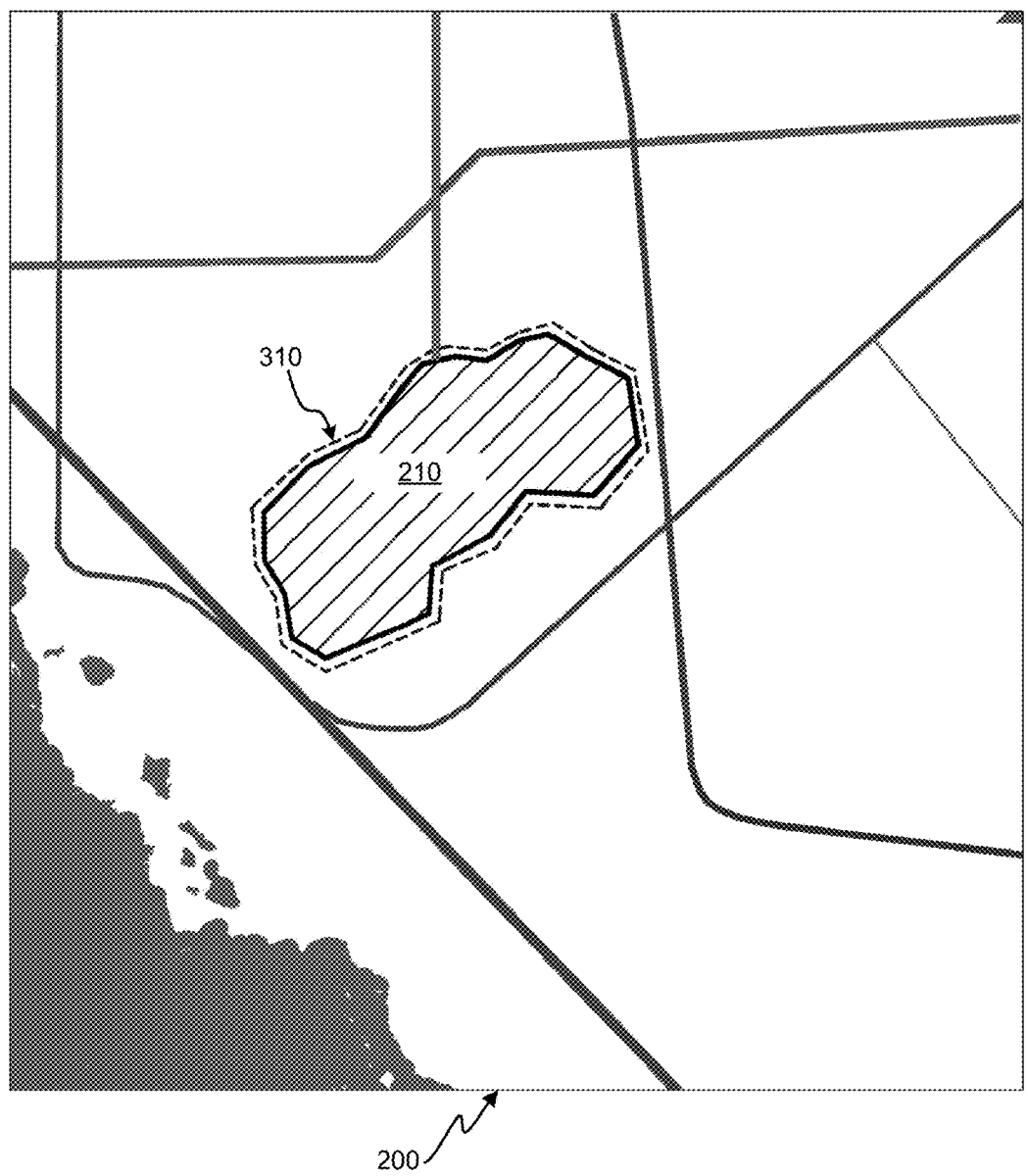
FIG. 3 is another map of the same area as illustrated in FIGS. 2A and 2B, illustrating the geographical coverage area of APs described in a venue information file, according to techniques described herein.

FIG. 3 is another map of the same area 200 as illustrated in FIGS. 2A and 2B, illustrating the geographical coverage area 310 of APs described in a venue information file, according to techniques described herein. As with FIGS. 2A and 2B, a positioning system, such as the positioning system 100 of FIG. 1, may operate to provide AP location information regarding a venue 210. Here, however, an almanac server stores AP location information for APs at (and/or near) the venue 210 in a venue information file, rather than in separate tiles (as shown in FIG. 2B). The venue information file can then be sent to mobile devices that enter (or may enter) the venue 210. This enables the mobile devices to download and store a single venue information file once, rather than download and re-download traditional tiles as illustrated in FIGS. 2A and 2B.

The boundaries of the geographical coverage area 310 of APs whose location information is contained in the venue information file may vary, depending on desired functionality. In some embodiments, as illustrated in FIG. 3, these boundaries may fall entirely outside of the actual boundaries of the venue 210. In some embodiments, these boundaries may fall on or within boundaries of the venue 210. It will be understood, however, that the boundaries of the geographical coverage area 310 may be dependent on the actual coverage area of the APs, so it may vary from the boundaries of the venue 210. Ultimately, however, the geographical coverage area 310 of the APs of the venue information file is specific to the venue 210.

It can be noted that the venue information and file shown in FIG. 3 can be utilized in addition or as an alternative to other tile information, such as the grid of tiles shown in FIGS. 2A and 2B, or tiles arranged in some other manner. A person of ordinary skill in the art will recognize many variations to the embodiments shown herein. An almanac server (such as the almanac server(s) 160 of FIG. 1) can create and maintain the venue information file at keep it in an almanac (or other data structure), which may contain other AP location (e.g., tile) information. It can further be noted that, although embodiments described herein describe an almanac server maintaining the venue information file, the term "almanac server" is used as a matter of convention. Other embodiments may instead employ another server or device to create and/or maintain the venue information file.

As previously described, the venue information file can contain information similar to the information contained in traditional tiles. Such information can include, for example, the location and/or boundaries of the venue 210 and/or coverage area 310, the names and/or locations of each AP within the coverage area 310, and the like. According to embodiments herein, the almanac server can further gather crowdsourcing information from mobile devices within the venue 210 to help determine which APs may be contained within the venue 210. (This process is described in more detail below.) When a mobile device approaches, enters, or is predicted to enter the venue 210, the mobile device can download the venue information file from the almanac server to help the mobile device, the almanac server, and/or other devices (e.g., positioning server(s) or other devices that may receive positioning information from the mobile device), and determine positioning information of the mobile device, based on the venue information file. For example, by measuring its distance from various APs within the venue 210, and by determining the known locations each of the various APs from the venue information file, a mobile device can calculate its estimated position within the venue 210.

Figure 4:
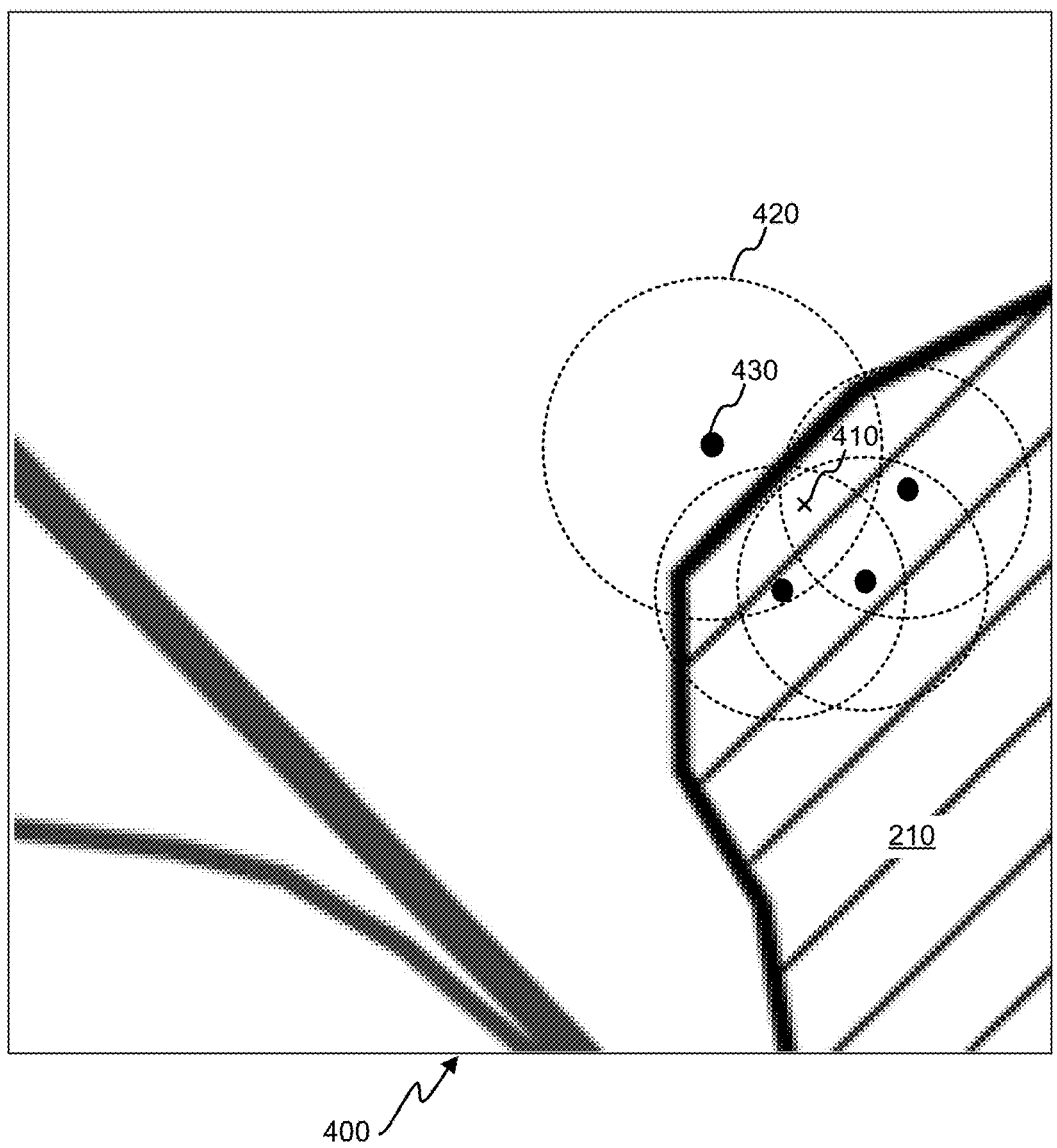
FIG. 4 is a close-up view of a portion of the area shown in FIGS. 2A, 2B, and 3, provided to help illustrate how the geographical coverage area of APs whose location information is contained in the venue information file may be established, according to some embodiments.

FIG. 4 is a close-up view 400 of a portion of the area 200 shown in FIGS. 2A, 2B, and 3 near a boundary of the venue 210, provided to help illustrate how the geographical coverage area 310 (shown in FIG. 3) of APs whose location information is contained in the venue information file may be established, according to some embodiments. In FIG. 4, the locations 430 of a few APs are shown by dots at the center of coverage regions 420. (To avoid clutter in FIG. 4, the location 430 and coverage region 420 of only one AP are labeled.)

To create and maintain the venue information file for the venue 210, crowdsourcing information can be gathered from mobile devices at one or more locations within the venue 210. These mobile devices may utilize an earlier version of the venue information file, and thus, the venue information file may be continuously updated through a process of gathering information from mobile devices, updating the venue information file based on the information, and distributing the updated venue information file to mobile devices. (This process is described below in relation to FIGS. 5 and 6.) Additionally or alternatively, it may be established that the mobile device is at a particular venue by utilizing one or more reliable sources, such as user entry (e.g., the user enters source and destination in a navigation program), geofence tag names, location server, SSID, information received from an application executed by the mobile device, a wireless location beacon, etc.). As discussed in further detail below, if no venue information is known to the mobile device, the mobile device may still upload information regarding the APs (as well as current location, distance and/or other measurements of the APs, and/or other information) to a server, and the server may make the determination whether to associate the APs with the venue.

According to some embodiments, a mobile device may "tag" APs as being associated with the venue 210. That is, while at the venue 210, a mobile device can send location information (e.g., coordinates and/or venue identification information) to an almanac server, along with a cluster of visible APs to be associated with the venue. As described herein, APs that are "tagged" or "associated with" a venue are identified by a mobile device or server as being in or nearby the venue. (As indicated elsewhere herein, "nearby" may mean that the coverage area of an AP outside the venue may overlap the boundaries of the venue. That is, an AP outside the venue may be detectable by a mobile device within the venue.) The association of an AP with a venue can be maintained, for example, in a data field sent to and/or maintained by the server. In some embodiments, a cluster of visible APs to be tagged with the venue can include all APs detected by a mobile device when the mobile device is at a venue 210, all visible APs when a threshold number of the visible APs are already tagged as being associated with the venue, all visible APs broadcasting the same (or similar) SSID (or other identity), and the like.

For instance, if the mobile device is at location 410 within the venue 210, the mobile device may send information to the almanac server identifying all four visible APs at that location. In such embodiments, the determination of whether the mobile device is within the boundaries of the venue 210 may be made by using established location information (e.g., positioning based on measurements taken from the four (or other) APs, SPS information, etc.), compared with map data regarding the boundaries of the venue 210 (received, for example, from the Geographic Information System (GIS) and/or other databases). The almanac server can then tag the four APs as being associated with the venue 210 and include the location information for these APs in the venue information file for the venue 210.

In other techniques for associating APs with a venue, map data may not always be needed. For instance, when a threshold of the visible APs are already associated with the venue, and others are not, these others may be associated with the venue as well. In some embodiments, the threshold may be a certain number. In some embodiments, the threshold may be a percentage or portion of the total detected APs. In FIG. 4, for example, if three of the four APs detected by the mobile device at location 410 are associated with the venue 210, but the fourth is not, the mobile device or almanac server may associate the fourth with the venue 210 as well, if the threshold of APs associated with the venue is three. In such embodiments, the mobile device may determine (e.g., using a current venue information file) which APs are not associated with the venue 210 and send information regarding these APs to the almanac server, prompting the server to associate the APs with the venue. Additionally or alternatively, the mobile device may send information regarding all of the APs detected at location 410, and the server can determine whether a threshold number of APs is associated with the venue and whether to associate any additional detected APs with the venue 210. According to some embodiments, this threshold number may be provided by the server to the mobile device in conjunction with and/or as a part of a tile for a venue. Moreover, the threshold number may increase or decrease with the size of the venue. (Smaller venues may, for example, have a lower threshold number. A very small venue may have a threshold number of a single AP.)

In such embodiments, a comparison of the location of the APs with a map may ultimately be performed (by a mobile device and/or an almanac server) to prevent the boundaries of the coverage area of APs associated with the venue from expanding indefinitely. For instance, where a threshold number of APs are associated with the venue, another detected AP may be provisionally associated with the venue. However, the mobile device or almanac server may flag (or indicate by some other means) that the location of the AP may need to be further verified. If such is the case, measurements of the AP may be taken by a mobile device at one or more known locations to determine the location of the AP. This information may then be compared with a map to determine whether the AP is located within the venue. If so, it can be associated with the venue. If not, it may still be included in the venue information file, but with information categorizing the AP as being outside the venue (thereby enabling the mobile device to, for example, exclude the AP when determining, at a certain location within the venue 210, whether a threshold number of APs are associated with the venue 210).

As indicated above, techniques for associating APs with a venue may additionally or alternatively include determining whether APs have the same (or similar) SSID or other identifier. For instance, a mobile device could detect an AP that has the same SSID as an AP that is associated with the venue (e.g., as indicated in a current venue information file), and then send information to the almanac server that identifies the AP as an AP to be associated with the venue. The almanac server may then associate the AP with the venue.

Alternatively, the mobile device may send the SSID (or other identifying information) of APs detected while the mobile device is at the venue 210, and the server can determine whether to associate the AP with the venue 210.

In some instances, APs may be associated with a venue when only portion of the SSID (or other identifying information) is the same as corresponding information for APs already associated with the venue. For example, if the SSID for an AP associated with Venue X is "Venue_X_Bldg_A" and the SSID for an AP not yet associated with Venue X is "Venue_X_Bldg_B," the mobile device or almanac server can identify that a portion of the SSIDs for both APs (that is, "Venue_X") is the same, and the AP can be associated with the venue. In some embodiments, a threshold number or percentage of characters of the SSIDs (or other identifying information) may be used to determine whether they are similar enough for the AP not yet associated with the venue to be associated therewith.

In some embodiments, techniques for associating APs with a venue may additionally or alternatively involve determining whether the AP should be associated with a venue based on the SSID of the AP. In the example above, for instance, if the SSID for an AP not yet associated with Venue X is "Venue_X_Bldg_B" the mobile device or almanac server may determine to associate the AP with Venue X based on a comparison of the SSID with the name of the venue. The venue name and its physical boundaries can be based on map data, which may be compared with a known location of the mobile device at the time the AP was detected.

In addition to providing identifying information of the APs, a mobile device can provide measurements pertaining to those AP's to the almanac server, enabling the almanac server to determine the AP location information for the venue information file. For instance, a particular mobile device at a location 410 within the venue 210 may obtain one or more measurements pertaining to one or more APs in or near the venue 210, and send those measurements to the almanac server(s) 160. This information can be sent as the measurements are obtained, in batches at certain scheduled times or time periods, upon receiving a request from the almanac server(s) 160, together with the information for venue association (described above), etc. In some embodiments, for example, a mobile device will collect these measurements automatically when possible and consolidate the measurement data. The consolidated data will then be uploaded at regular time intervals or after certain triggering events (e.g., upon request by an almanac server, upon exiting the venue 210, etc.).

Measurements can include a variety of types of measurements. These can include, for example, values indicative of signal time of arrival, signal observed time difference of arrival (OTDOA), signal strength (e.g., RSSI), RTT, number of APs detected, and/or other signal characteristics of one or more APs detected by the mobile device. In some embodiments, the mobile device 105 can take these measurements at certain scheduled times or time periods, at random times, in conjunction with other functionality (e.g., when the mobile device 105 is scanning for available Wi-Fi network), where possible (e.g., when the software and/or hardware used for scanning becomes available), etc.

Additionally or alternatively, when providing crowd-sourced information, the mobile device may send location information, if known (which may be obtained from a Wi-Fi or other WAN, SPS, or the like). Thus, in certain embodiments, a mobile device may send information regarding its location 410 (e.g., latitudinal and longitudinal coordinates), along with identities of APs it detects at that location 410. The mobile device may further include a unique identity of the mobile device in the information sent, which can allow the almanac server to determine when a single mobile device sends multiple sets of data. It can be noted that, when obtaining measurements, a mobile device need not use an AP for data communication (that is, the AP may not be used by the mobile device to establish communication to the Internet or other data communication networks). Instead, a mobile device may simply detect beacons sent by an AP and/or obtain measurements related to the AP.

APs near the boundary but outside the venue 210 may be detected by mobile devices and therefore included in the venue information file and used by mobile devices to determine location within the venue 210. As shown in FIG. 4, for example, a mobile device at location 410 within the venue may be within the coverage area of the four APs in FIG. 4. That is, a mobile device at location 410 may detect the four APs illustrated in FIG. 4, although one of the AP is outside the boundary of the venue 210. By including the coverage area of APs near but outside the venue 210, the coverage area of APs whose location information is contained in the venue information file may extend beyond the boundaries of the venue 210, as shown by geographical coverage area 310 in FIG. 3. As indicated above, however, APs outside the venue 210 may be characterized as such in the venue information file to prevent the boundaries of the geographical coverage area 310 from expanding indefinitely.

According to some embodiments, information provided by a mobile device may be verified by an almanac server. For instance, a mobile device may utilize a venue information file to tag an AP with the venue. The mobile device may then send information regarding the AP, including the tag (or other information indicating the AP should be associated with the venue), to the almanac server. The almanac server may then wait until it receives information from a threshold number of other mobile devices (and/or the same mobile devices at other times) indicating that the AP should be associated with the venue before associating the AP with the venue in the venue information file. Some embodiments may impose a certain time limit by which the information from the threshold number of other mobile devices is to be received before the AP is associated with the venue. According to some embodiments, the almanac server may employ additional or alternative techniques for filtering out data received by mobile device that may not be accurate (e.g., by removing statistical outliers, comparing AP location data with previously-established venue boundaries, independently verifying mobile device location, and the like).

Depending on desired functionality, the request for and download of the venue information file by a mobile device may be triggered at different times. For example, some embodiments may trigger the download of the venue information file when a planned route of travel to or within a threshold distance of the venue is established by the mobile device (e.g., by a navigation application executed by the mobile device). In some embodiments, the venue information file may be downloaded by a mobile device once the mobile device enters or is within a threshold distance of the venue.

Figure 5:
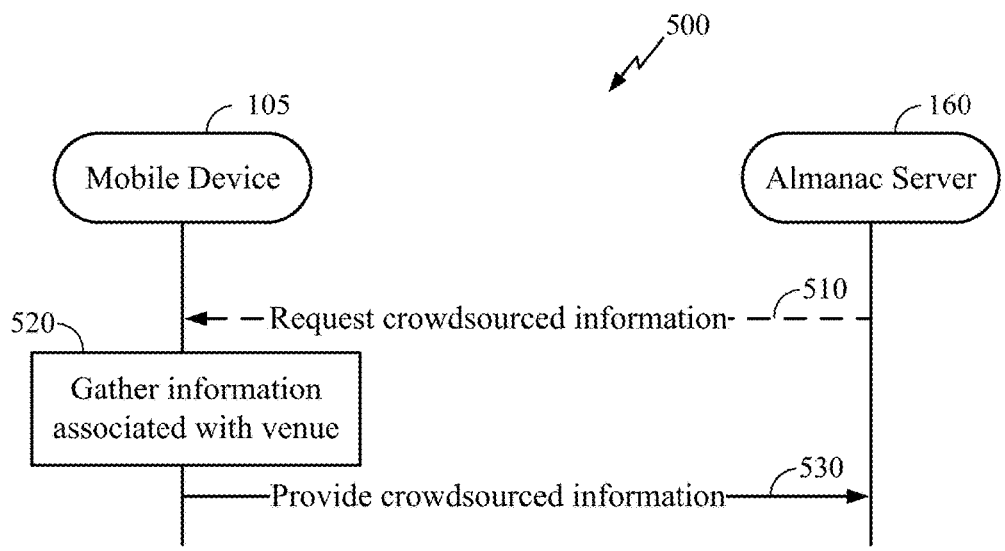
FIGS. 5 and 6 are call flow diagrams illustrating the interaction between a mobile device and an almanac server 160, according to some embodiments.
Figure 6:
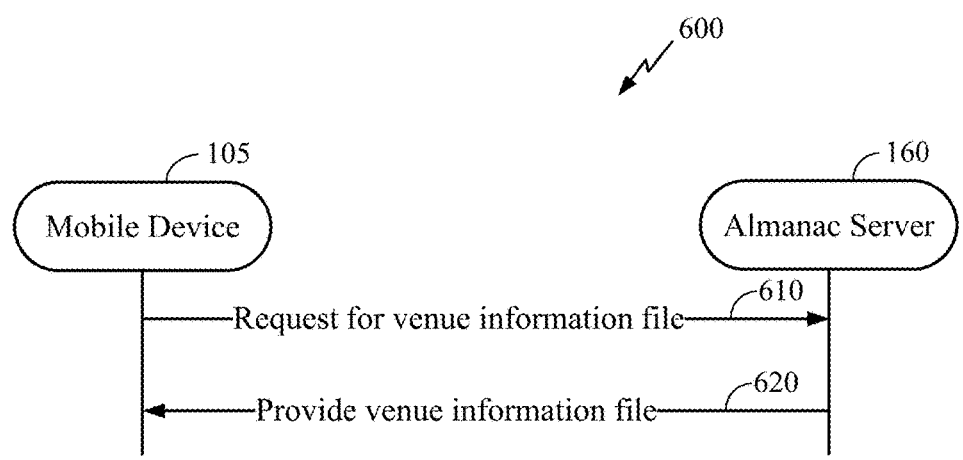

FIGS. 5 and 6 are simplified call flow diagrams illustrating the interaction between a mobile device and an almanac server 160, according to some embodiments. It will be appreciated that the embodiments may utilize different communication technologies, protocols, formats, etc. to implement the illustrated interactions. Some embodiments may include additional or alternative actions. A person of ordinary skill in the art will recognize many variations.

FIG. 5 is a call flow diagram that illustrates how an almanac server 160 can receive crowdsourced information from a mobile device 105. Action 510 shows how the almanac server 160 can optionally send a request for crowdsourced information to the mobile device 105. At action 520, the mobile device obtains the crowdsourced information gathering information associated with the venue. As indicated above, this may include determining an AP to be associated with the venue by determining a threshold number of detected APs are associated with the venue and identifying an AP that is not yet associated with the venue, and/or determining that at least part of the identity (e.g., SSID) of each of a plurality of detected APs is the same. As also indicated above, some embodiments may have the almanac server make the determination of whether to associate an AP with a venue. As such, the mobile device may simply provide crowdsourced information for all detected APs (without a determination or indication of which APs are or should be associated with the venue), and the almanac server can decide which APs to associate with the venue, if any. Crowdsourced information may further include measurements taken by the mobile device 105 of the APs, to help determine the location of the APs, as well as identification information of the mobile device 105, location information of the mobile device 105, and the like.

At action 530 the mobile device provides the crowdsourced information to the almanac server 160. In the embodiment shown, gathering information regarding APs to be associated with a venue at action 520 may be triggered by the (optional) request for crowdsourced information at action 510. However, other embodiments may obtain information without such a request. In some embodiments, for example, a request for crowdsourced information at action 510 may cause the mobile device 105 to provide crowdsourced information at action 530 based on previously-obtained measurements. In some embodiments, as noted previously, the mobile device 105 may gather the information at action 520 without any request from the almanac server 160. As noted above, some embodiments may obtain information regarding APs (e.g., information for association with a venue and/or measurements) and/or provide crowdsourced information periodically, based on a schedule, and/or based on other triggers. As indicated above, measurements and/or other information obtained by the mobile device 105 may be consolidated and provided in the crowdsourced information.

FIG. 6 is a call flow diagram illustrating an embodiment for downloading the venue information file to the mobile device 105 from the almanac server 160, in which the almanac server 160 determines the venue information file to download. Here, the mobile device 105 may be the same or a different mobile device than the mobile device 105 of FIG. 5.

At action 610 of FIG. 6, the mobile device 105 requests the venue information file from the almanac server 160. As indicated previously, this can be triggered by any of a variety of events, determining a planned route of travel using an application executed by the mobile device 105, entering or coming in close proximity to the venue, and so forth. In some embodiments, the request may not be an explicit request for the venue information file, but instead an indication of a current location or planned route of travel.

At action 620 the venue information file is provided to the mobile device 105 by the almanac server 160. Here, if the request is not an explicit request for the venue information file, the almanac server may determine from a received current location or planned route of travel of the mobile device that the mobile device is or will be located in a particular venue. The almanac server 160 may then identify the corresponding venue information file for the venue and provide it to the mobile device 105.

Figure 7:
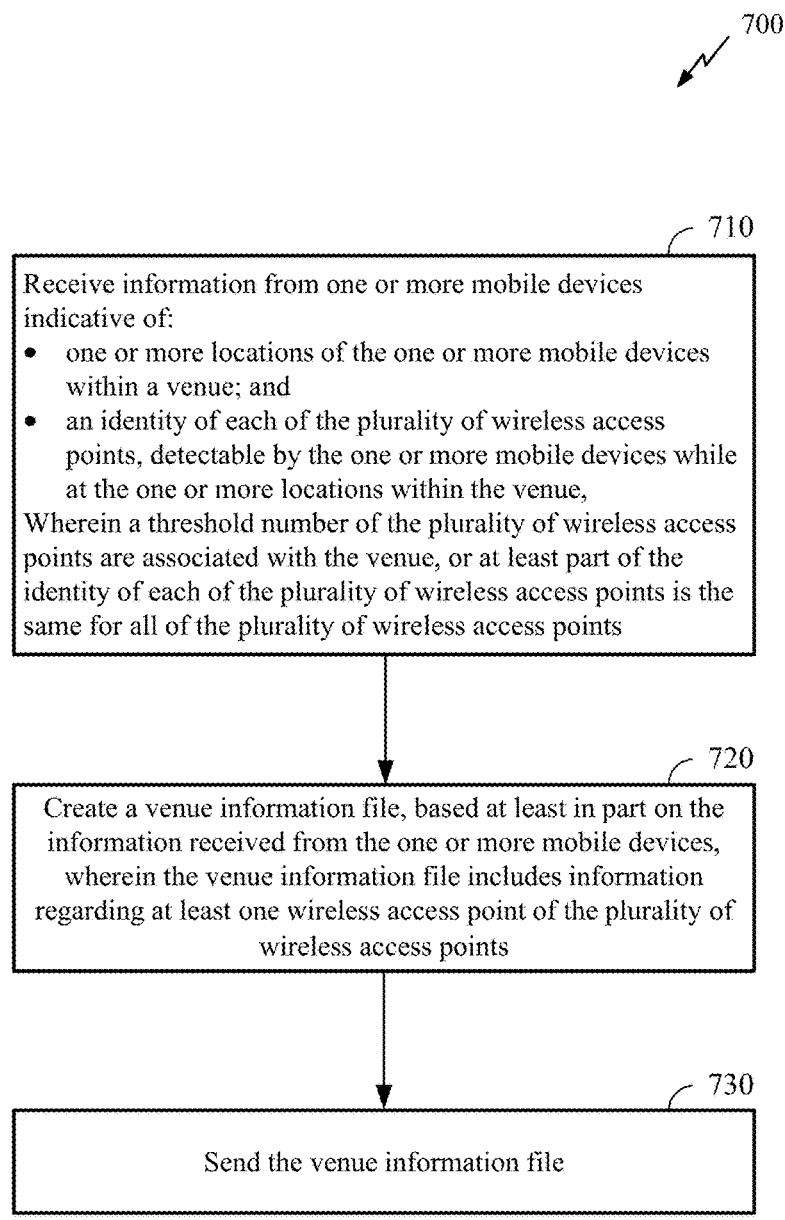
FIG. 7 is a process flow diagram that illustrates a method of determining and distributing venue-specific wireless access point location data via crowdsourcing, according to one embodiment.

FIG. 7 is a process flow diagram that illustrates a method 700 of determining and distributing venue-specific wireless access point location data via crowdsourcing, according to one embodiment. One or more blocks of the method 700 can be performed by a server, such as the almanac server(s) 160 of FIGS. 1, 5, and 6, for example. Particular means for performing the illustrated blocks can be performed by hardware and/or software components of a computer system, such as the example computer system illustrated in FIG. 10 and described in further detail below. Additionally, as with other figures provided herein, FIG. 7 is provided as an example. Other embodiments of the invention may perform similar methods in different manners, by, for example, adding, omitting, combining, separating, rearranging, and/or otherwise altering the blocks illustrated in FIG. 7. A person of ordinary skill in the art will recognize many variations.

The functionality at block 710 comprises receiving information from one or more mobile devices indicative of one or more locations of the one or more mobile devices within a venue; and an identity of each of the plurality of wireless access points, detectable by the one or more mobile devices while at the one or more locations within the venue, wherein a threshold number of the plurality of wireless access points are associated with the venue, or at least part of the identity of each of the plurality of wireless access points is the same for all of the plurality of wireless access points. As indicated previously, such information (location of the mobile device within a venue and access points detectable at the location) can inform a decision whether to associate certain access points with the venue. In particular, as described above, a where a threshold number of a plurality of detected access points are associated with the venue, the remaining detected access points may also be associated with the venue.

Some embodiments may vary from this basic functionality. For example, because wireless access points may be detected by a mobile device as far as a mile away or more, some embodiments may filter out remote wireless access points (e.g., wireless access points beyond the threshold distance) by determining a distance of the wireless access points. Embodiments may utilize, for example, RSSI and/or RTT measurements to determine a distance of the wireless access points. If the determined distance of the wireless access point is beyond a particular threshold (e.g., where an RSSI measurement is below certain RSSI threshold value and/or an RTT measurement is above a certain RTT threshold value), the wireless access point will be ignored by the mobile device. That is, information regarding the wireless access point will not be provided by the mobile device to the server.

Other information, such as measurement and/or other data indicative of the location of the access points, may also be received from mobile devices as crowdsourced information. As previously noted, where the venue is known to the mobile device, the mobile device may also identify the venue to the server (e.g., by sending information indicative of the identity of the server). A determination of whether the venue is "known" to the mobile device may be made based on whether or not a particular source was used to determine the venue, and/or a calculation of certainty that may weight several different factors (e.g., information source types, certainty of current location, duration and/or location within the venue, and the like), Additionally or alternatively, where a portion of the identity (e.g., SSID) of each of the access points is determined to be the same, any access points not associated with the venue can be.

Other features may be implemented, depending on desired functionality. For example, some embodiments may cause the server to identify the venue by comparing the one or more locations of the one or more mobile devices within the venue to a map. Some embodiments may cause the server to extract, from the information from the one or more mobile devices, an identity of the venue. (As discussed above, this identity may be found in the SSID of the access point.)

Figure 10:
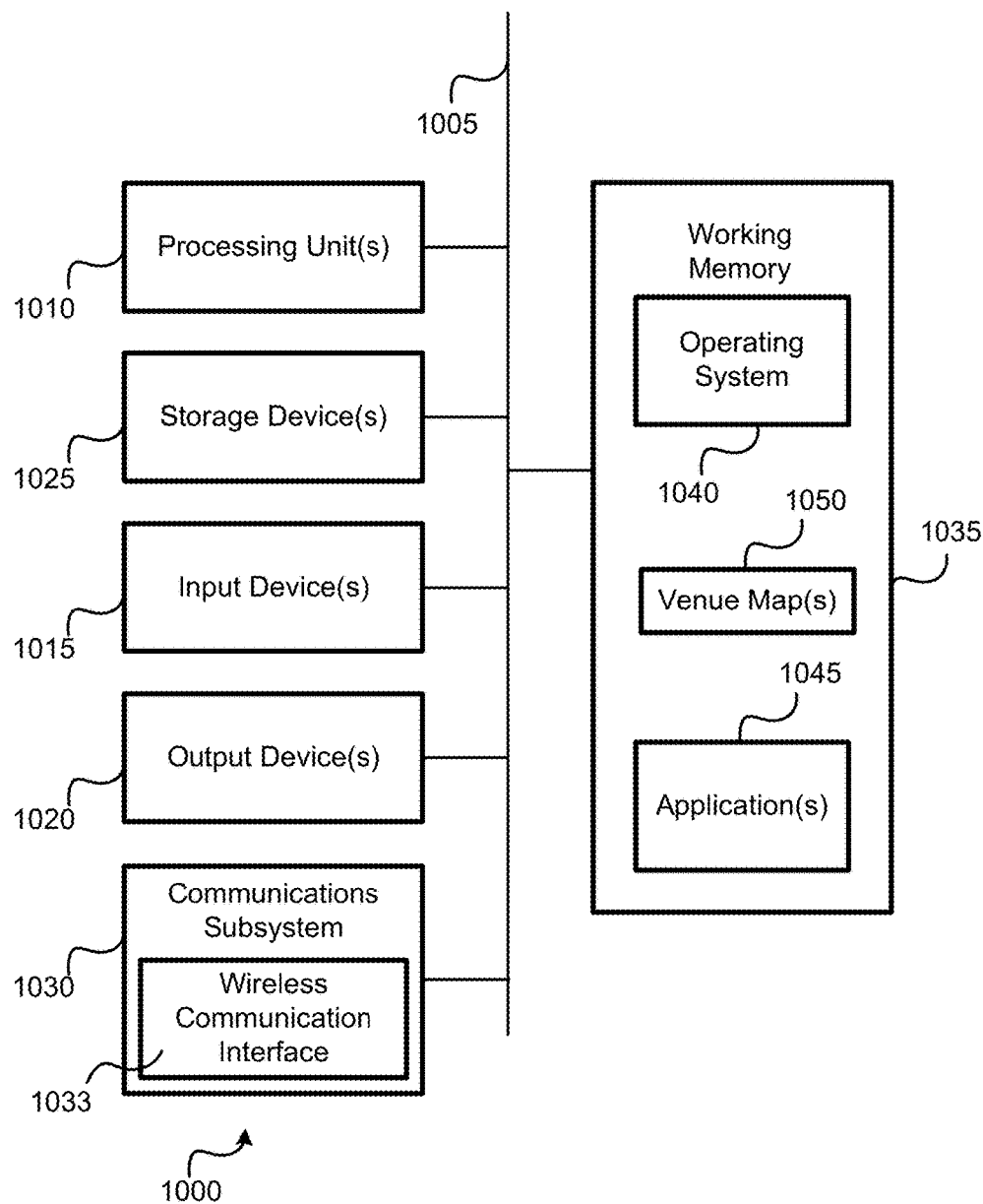
FIG. 10 is a block diagram of an embodiment of a computer system.

Means for performing the functionality of block 710 may comprise, for example, the processing unit(s) 1010, storage device(s) 1025, working memory 1035, and/or communications subsystem 1030, as shown in FIG. 10 and described in further detail below. For example, the processing unit(s) 1010 can be configured to cause information received via the communications subsystem 1030 from one or more mobile devices to be routed to and/or stored in storage device(s) 1025 and/or working memory 1035.

The functionality at block 720 comprises creating a venue information file, based at least in part on the information received from the one or more mobile devices, wherein the venue information file includes information regarding at least one wireless access point of the plurality of wireless access points. Here, as a result of receiving the information obtained at block 710, a venue information file may be created to reflect this information. Accordingly, such "creation" in block 720 can include not only creating a new venue information file, but also updating an earlier version of the venue information file.

Again, other features may be implemented, depending on desired functionality. For instance, the information received from the one or more mobile devices may be indicative of a location of at least one of the plurality of wireless access points. In such instances, the creation of the venue information file associated with the venue may be based at least in part on a comparison of the location of the at least one of the plurality of wireless access points with a map of the venue. Additionally or alternatively, as indicated in embodiments described above, the threshold number of the plurality of wireless access points may be associated with the venue and categorized as being located within the venue. The method 700 may then include determining the location of the at least one of the plurality of wireless access points to be outside of the venue and, in response to determining the location of the at least one of the plurality of wireless access points to be outside a boundary of the venue, categorizing the at least one of the plurality of wireless access points as being located outside of the venue. Nonetheless, the venue information file may include information regarding the at least one of the plurality of wireless access points, but with an indication that the at least one of the plurality of wireless access points is categorized as being located outside of the venue. In some embodiments, determining the location of the at least one of the plurality of wireless access points to be outside of the venue may further comprise determining a distance the at least one of the plurality of wireless access points. This can, for instance, facilitate a determination of the location of the at least one of the plurality of wireless access points.

Means for performing the functionality of block 720 may comprise, for example, the processing unit(s) 1010, storage device(s) 1025, working memory 1035, and/or application(s) 1045, as shown in FIG. 10 and described in further detail below. For example, the processing unit(s) 1010 can be configured to create the venue information file by executing an algorithm in accordance with an application 1045 in working memory 1035. Results may be stored in storage device(s) 1025.

At block 730, the venue information file is sent. As noted previously, because gathering crowdsourced information from mobile devices can be independent of the process of distributing the venue information file, the venue information file may be sent to one or more mobile devices that may be different from the mobile devices from which the information at block 710 is received. The functionality at block 730 may be triggered by a request from the mobile device for the venue information file, and the venue information file can be sent to that requesting mobile device.

Means for performing the functionality of block 730 may comprise, for example, the processing unit(s) 1010, storage device(s) 1025, working memory 1035, and/or communications subsystem 1030, as shown in FIG. 10 and described in further detail below. For example, the processing unit(s) 1010 can be configured to cause the venue information file to be sent via the communications subsystem 1030 to a mobile device.

Figure 8:
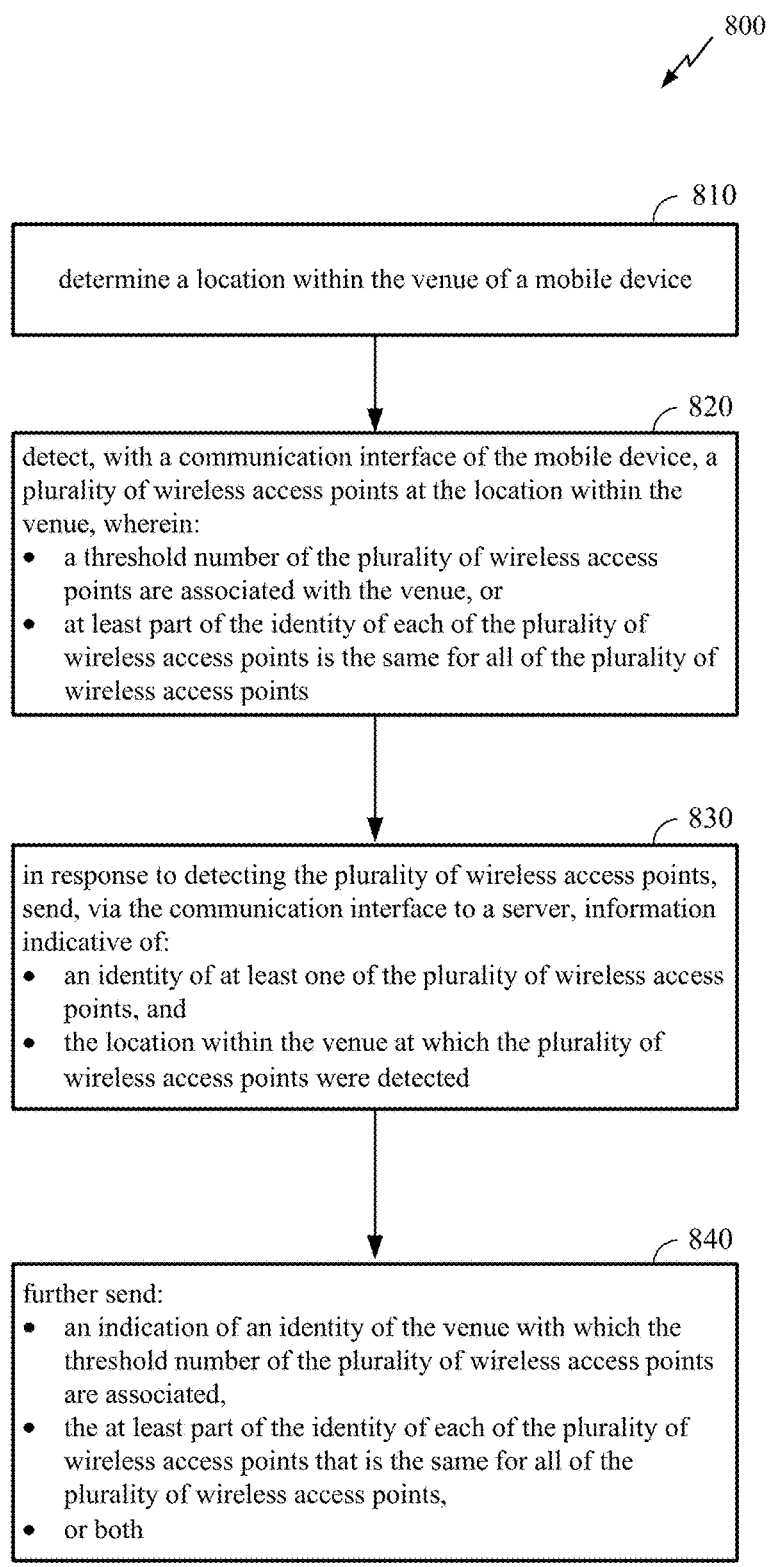
FIG. 8 is a process flow diagram that illustrates a method of providing information for the determination of venue-specific wireless access point location data, according to one embodiment.

FIG. 8 is a process flow diagram that illustrates a method 800 of providing information for the determination of venue-specific wireless access point location data, according to one embodiment. One or more blocks of the method 800 can be performed by a mobile device, such as the mobile device 105 of FIGS. 1, 5, and 6, for example. Particular means for performing the illustrated blocks can be performed by hardware and/or software components of a mobile device 105, such as the components illustrated in FIG. 9 and described in further detail below. Additionally, as with other figures provided herein, FIG. 8 is provided as an example. Other embodiments of the invention may perform similar methods in different manners, by, for example, adding, omitting, combining, separating, rearranging, and/or otherwise altering the blocks illustrated in FIG. 8. A person of ordinary skill in the art will recognize many variations.

The functionality at block 810 comprises determining the location within the venue of a mobile device. As noted previously with regard to FIG. 1, the location of the mobile device within a venue can be established using any of a variety of techniques, including satellite positioning, trilateration of antenna signals, and more. Means for performing the functionality of block 820 may comprise, for example, the processing unit(s) 910, memory 960, SPS receiver 980 and antenna 982, wireless communication interface 930 and/or antenna 932, as shown in FIG. 9 and described in further detail below.

The functionality at block 820 comprises detecting a plurality of wireless access points at the location within the venue, wherein a threshold number of the plurality of wireless access points are associated with the venue, or at least part of the identity of each of the plurality of wireless access points is the same for all of the plurality of wireless access points. Here, the a mobile device may determine which of the plurality of wireless access points are associated with the venue through the use of a venue information file as described herein. Thus, in some embodiments, a mobile device can implement the functionality of block 820 without further communication with a server to determine which wireless access points are associated with the venue. Additionally or alternatively, the mobile device can determine whether at least part of the identity of each of the plurality of wireless access points is the same, prior to sending any information to a server. As indicated previously, determining that at least part of the identity of each of the plurality of wireless access points is the same can comprise comparing a threshold number of characters of the SSIDs of the various wireless access points. In some embodiments, a location of the at least one of the plurality of wireless access points may be determined and included in information provided to a server. In some embodiments, the determination of the location may be made using RSSI measurements, RTT measurements, or both. In some embodiments, RSSI measurements, or RTT measurements, or both may be provided to the server, along with a location of the mobile device, enabling the the server to determine the location of the at least one of the plurality of wireless access points.

Figure 9:
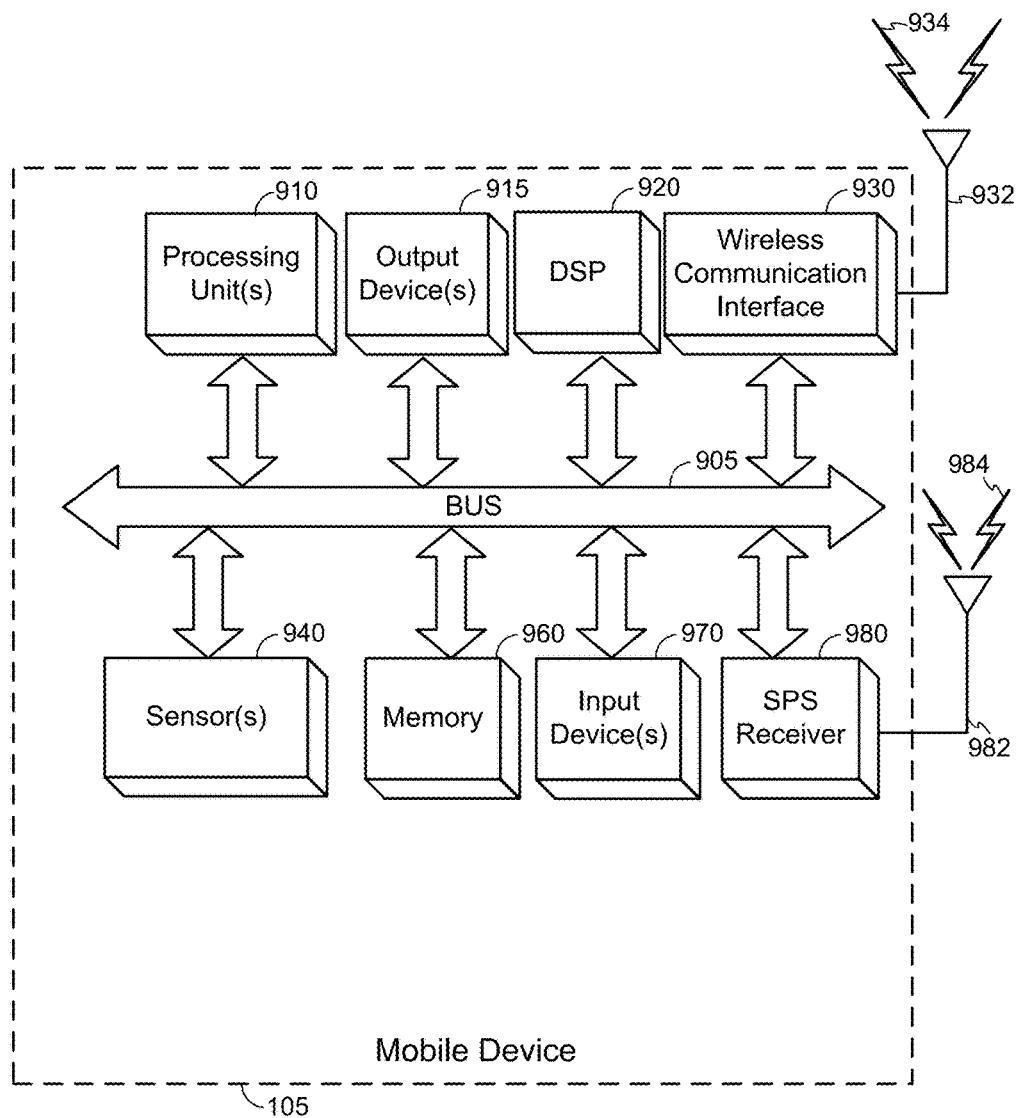
FIG. 9 is a block diagram of an embodiment of a mobile device.

Means for performing the functionality of block 820 may comprise, for example, the processing unit(s) 910, memory 960, wireless communication interface 930 and/or antenna 932, as shown in FIG. 9 and described in further detail below. For example, the processing unit(s) 910 can be configured to cause the via the wireless communication interface 930 to detect the plurality of wireless access points.

At block 830, the method includes sending, in response to detecting the plurality of wireless access points, information indicative of an identity of at least one of the plurality of wireless access points, and the location within the venue at which the plurality of wireless access points were detected. As described previously, crowdsourced information can include data utilized to determine whether one or more wireless access points should be associated with the venue, such as RSSI can/or RTT measurements regarding the AP. Here, after detecting the wireless access points as indicated in block 820, the information is provided to a server including the identity of at least one of the plurality of wireless access points, and a location within the venue where these access points were detected.

Means for performing the functionality of block 830 may comprise, for example, the processing unit(s) 910, memory 960, wireless communication interface 930 and/or antenna 932, as shown in FIG. 9 and described in further detail below. For example, the processing unit(s) 910 can be configured to obtain the information in block 830 and cause the wireless communication interface 930 to send it to a server.

At block 840, the method further comprises sending an indication of an identity of the venue with which the threshold number of the plurality of wireless access points are associated, the at least part of the identity of each of the plurality of wireless access points that is the same for all of the plurality of wireless access points, or both. Here, additional information is provided to a server for associating at least one wireless access point with the venue, which can correspond with the information detected at block 820. For example, if at block 820 the threshold number of the plurality of wireless access points is associated with the venue, then the indication of an identity of the venue can be provided at block 840. Additionally or alternatively, if at block 820 at least part of the identity of each of the plurality of wireless access points is the same, then that part of the identity can be sent at block 840.

Means for performing the functionality of block 840 may comprise, for example, the processing unit(s) 910, input device(s) 970, and/or memory 960 as shown in FIG. 9 and described in further detail below. For example, the processing unit(s) 910 can be configured to send the indication of the identity of the venue and/or the at least part of the identity of each of the plurality of wireless access points as provided at block 840.

As noted previously, information can be sent by the mobile device in response to on a variety of triggers, such as when location measurements are obtained, in batches at certain scheduled times or time periods, upon receiving a request from the almanac server(s) 160, upon establishing a Wi-Fi data connection, and the like. Accordingly, any or all of the functionality of the blocks shown in FIG. 8 may be performed in response to any such triggers.

FIG. 9 illustrates an embodiment of a mobile device 105, which can be utilized as described herein above. For example, the mobile device 105 can be used in the positioning system 100 of FIG. 1 and/or to provide data or perform other functions as described in relation to FIGS. 5, 6, and 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations.

The mobile device 105 is shown comprising hardware elements that can be electrically coupled via a bus 905 (or may otherwise be in communication, as appropriate). The hardware elements may include a processing unit(s) 910 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 9, some embodiments may have a separate DSP 920, depending on desired functionality. The mobile device 105 also may comprise one or more input devices 970, which may comprise without limitation one or more touch screens, touch pads, microphones, buttons, dials, switches, and/or the like; and one or more output devices 915, which may comprise without limitation, one or more displays, light emitting diodes (LEDs), speakers, and/or the like.

The mobile device 105 might also include a wireless communication interface 930, which may comprise without limitation a modem, a network card, an infrared communication device, a wireless communication device, and/or a chipset (such as a Bluetooth™ device, an IEEE 802.11 device, an IEEE 802.15.4 device, a Wi-Fi device, a WiMAX device, cellular communication facilities, etc.), and/or the like. The wireless communication interface 930 may permit data (such as crowdsourced information, as described in the embodiments herein) to be communicated with a network, wireless access points, other computer systems, and/or any other electronic devices described herein, such as the mobile network provider 140, Internet 150, and/or other networks described in relation to FIG. 1. The communication can be carried out via one or more wireless communication antenna(s) 932 that send and/or receive wireless signals 934.

Depending on desired functionality, the wireless communication interface 930 may comprise separate transceivers to communicate with base transceiver stations (e.g., antenna 120) and other wireless devices and access points. As indicated previously with respect to FIG. 1, these different data networks may comprise various network types. Additionally, a WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 1002.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

The mobile device 105 can further include sensor(s) 940. Such sensors may comprise, without limitation, one or more accelerometer(s), gyroscope(s), camera(s), magnetometer(s), altimeter(s), microphone(s), proximity sensor(s), light sensor(s), and the like. Some or all of the sensor(s) 940 can be utilized, among other things, for dead reckoning and/or other positioning methods. Such positioning methods may be used to determine a location of the mobile device 105, which can be provided as part of the crowdsourced information detailed herein.

Embodiments of the mobile device may also include an SPS receiver 980 capable of receiving signals 984 from one or more SPS satellites (such as SPS satellites 110, of FIG. 1) using an SPS antenna 982. Such positioning can be utilized to complement and/or incorporate the techniques described herein. The SPS receiver 980 can extract a position of the mobile device, using conventional techniques, from SPS SVs of an SPS system, such as GNSS (e.g., Global Positioning System (GPS)), Galileo, GLONASS, Compass, Quasi-Zenith Satellite System (QZSS) over Japan, Indian Regional Navigational Satellite System (IRNSS) over India, Beidou over China, and/or the like. Moreover, the SPS receiver 980 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 960. The memory 960 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 960 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 105 (and/or a processing unit within a mobile device 105, and/or another device of a positioning system). In an aspect, then, such code and/or instructions can be used to configure and/or adapt a general purpose computer (or other device) to perform one or more operations in accordance with the described methods.

FIG. 10 illustrates an embodiment of a computer system 1000, which may be incorporated, at least in part, into devices such as the one or more almanac servers 160 as described in FIGS. 1 and 5-7, and/or a computing device incorporated and/or communicatively connected therewith, as described herein. FIG. 10 provides a schematic illustration of one embodiment of a computer system 1000 that can perform the methods provided by various other embodiments, such as the method described in relation to FIG. 7. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different physical locations.

The computer system 1000 is shown comprising hardware elements that can be electrically coupled via a bus 1005 (or may otherwise be in communication, as appropriate). The hardware elements may include processing unit(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein, including the methods described in relation to FIGS. 5-7. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which may comprise wireless communication technologies managed and controlled by a wireless communication interface 1033, as well as wired technologies. As such, the communications subsystem may comprise a modem, a network card (wireless or wired), an infrared communication device, a wireless communication device, and/or a chipset (such as a Bluetooth™ device, an IEEE 802.11 device, an IEEE 802.15.4 device, a Wi-Fi device, a WiMAX device, cellular communication facilities, UWB interface, etc.), and/or the like. The communications subsystem 1030 may include one or more input and/or output communication interfaces, such as the wireless communication interface 1033, to permit data to be exchanged with a network, mobile devices (such as the mobile device 105 of FIGS. 1, 5, and 6), other computer systems, and/or any other electronic devices described herein. Hence, the communications subsystem 1030 may be used to receive and send data (e.g., location data, and almanac, etc.) as described in the embodiments herein.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Software elements may further comprise data, such as venue maps(s) 1050, utilized by applications(s) 1045, which may be retrieved from storage device(s) 1025 and/or the communications subsystem 1030 as needed by the applications(s) 1045. Merely by way of example, one or more procedures described with respect to the method(s) discussed above, such as the methods described in relation to FIGS. 5-7, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods. For example, the computer system 1000 and software elements can be used to build and maintain an almanac as described herein (e.g., a database and/or other data structure that has the approximate locations of a plurality of APs and/or the approximate coverage regions of the plurality of APs). These approximate locations and/or coverage regions can be determined and/or updated using the techniques described herein. When changes to the almanac are made (e.g., due to new crowdsourced information obtained using the techniques described herein), the changes can be propagated to mobile devices via the Internet and/or other communication networks via, for example, tiles or venue information files.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A server for determining and distributing venue-specific wireless access point location data via crowdsourcing, the server comprising:
  a communication interface;
  a memory; and
  a processing unit communicatively coupled with the communication interface and the memory, the processing unit configured to cause the server to:
    receive, via the communication interface, information from one or more mobile devices indicative of:
      one or more locations of the one or more mobile devices within a venue; and
      an identity of each of a plurality of wireless access points detectable by the one or more mobile devices while at the one or more locations within the venue, the identity of each of the plurality of wireless access points obtained from data broadcast by the respective access point, wherein:
        a threshold number of the plurality of wireless access points are associated with the venue, or
        at least part of the identity of each of the plurality of wireless access points is the same for all of the plurality of wireless access points;
    create a venue information file, based at least in part on the information received from the one or more mobile devices, wherein the venue information file indicates a location of at least one wireless access point of the plurality of wireless access points; and
    send the venue information file via the communication interface to a receiving mobile device.

2. The server of claim 1, wherein the information received from the one or more mobile devices is further indicative of a location of at least one of the plurality of wireless access points, and the processing unit is configured to cause the server to create the venue information file based at least in part on a comparison of the location of the at least one of the plurality of wireless access points with a map of the venue.

3. The server of claim 1, wherein the threshold number of the plurality of wireless access points are associated with the venue and categorized as being located within the venue, and the processing unit is configured to cause the server to:
  determine the location of the at least one of the plurality of wireless access points to be outside of the venue;

in response to determining the location of the at least one of the plurality of wireless access points to be outside a boundary of the venue, categorizing the at least one of the plurality of wireless access points as being located outside of the venue; and including, in the venue information file, information regarding the at least one of the plurality of wireless access points categorizing as being located outside of the venue.

4. The server of claim 3, wherein the processing unit is configured to cause the server to, as part of determining the location of the at least one of the plurality of wireless access points to be outside of the venue, determine a distance of the at least one of the plurality of wireless access points from the mobile device.

5. The server of claim 1, wherein the processing unit is configured to cause the server to further extract, from the information from the one or more mobile devices, an identity of the venue.

6. The server of claim 1, wherein the processing unit is configured to cause the server to identify the venue by comparing the one or more locations of the one or more mobile devices within the venue to a map.

7. A mobile device comprising:
a wireless communication interface;
a memory; and
a processing unit communicatively coupled with the wireless communication interface and the memory, the processing unit configured to cause the mobile device to:
  detect, with the wireless communication interface, a plurality of wireless access points at a location within a venue, wherein:
    the mobile devices determines a threshold number of the plurality of wireless access points are associated with the venue, or
    at least part of an identity of each of the plurality of wireless access points is the same for all of the plurality of wireless access points, wherein the identity of each of the plurality of wireless access points is obtained from data broadcast by the respective access point;
  in response to detecting the plurality of wireless access points, send, via the wireless communication interface to a server, information indicative of:
    the identity of at least one of the plurality of wireless access points, and
    the location within the venue at which the plurality of wireless access points were detected; and
  further send, via the wireless communication interface to the server:
    an indication of an identity of the venue with which the threshold number of the plurality of wireless access points are associated, or
    the at least part of the identity of each of the plurality of wireless access points that is the same for all of the plurality of wireless access points,
    or both.

8. The mobile device of claim 7, wherein the processing unit is further configured to cause the mobile device to determine a location of the at least one of the plurality of wireless access points.

9. The mobile device of claim 8, wherein the processing unit is configured to cause the mobile device to determine the location of the at least one of the plurality of wireless access points using received signal strength indicator (RSSI) measurements, or round trip time (RTT) measurements, or both.

10. The mobile device of claim 8, wherein the processing unit is further configured to send, via the wireless communication interface to the server, information indicative of the determined location.

11. The mobile device of claim 7, wherein the processing unit is further configured to cause the mobile device to send, via the wireless communication interface to the server, information indicative of RSSI measurements, or round trip time RTT measurements, or both, related to the at least one of the plurality of wireless access points.

12. The mobile device of claim 7, wherein the processing unit is further configured to cause the mobile device to send the information:
  when location measurements are obtained,
  at a scheduled time or time period,
  upon receiving a request from the server, or
  upon establishing a Wi-Fi data connection, or
  any combination thereof.

13. The mobile device of claim 7, wherein the processing unit is further configured to cause the mobile device to, prior to sending the information indicative of the identity of at least one of the plurality of wireless access points, determine a distance of the at least one of the plurality of wireless access points.

14. The mobile device of claim 13, wherein the processing unit is configured to cause the mobile device to determine the distance of the at least one of the plurality of wireless access points by determining whether an RSSI measurement is below an RSSI threshold value, or an RTT measurement is above an RTT threshold value, or both.

15. A method of determining and distributing venue-specific wireless access point location data via crowdsourcing, the method comprising:
  receiving, via a communication interface, information from one or more mobile devices indicative of:
    one or more locations of the one or more mobile devices within a venue; and
    an identity of each of a plurality of wireless access points detectable by the one or more mobile devices while at the one or more locations within the venue, wherein:
      a threshold number of the plurality of wireless access points are associated with the venue, the identity of each of the plurality of wireless access points obtained from data broadcast by the respective access point, or
      at least part of the identity of each of the plurality of wireless access points is the same for all of the plurality of wireless access points;
  creating, with a processing unit, a venue information file, based at least in part on the information received from the one or more mobile devices, wherein the venue information file indicates a location of at least one wireless access point of the plurality of wireless access points; and
  sending the venue information file via the communication interface to a receiving mobile device.

16. The method of claim 15, wherein the information received from the one or more mobile devices is further indicative of a location of at least one of the plurality of wireless access points, the method further comprising creating the venue information file based at least in part on a comparison of the location of the at least one of the plurality of wireless access points with a map of the venue.

17. The method of claim 15, wherein the threshold number of the plurality of wireless access points are associated with the venue and categorized as being located within the venue, the method further comprising:
- determining the location of the at least one of the plurality of wireless access points to be outside of the venue;
- in response to determining the location of the at least one of the plurality of wireless access points to be outside a boundary of the venue, categorizing the at least one of the plurality of wireless access points as being located outside of the venue; and
- including, in the venue information file, information regarding the at least one of the plurality of wireless access points categorizing as being located outside of the venue.

18. The method of claim 17, wherein determining the location of the at least one of the plurality of wireless access points to be outside of the venue comprises determining a distance of the at least one of the plurality of wireless access points from the mobile device.

19. The method of claim 15, further comprising extracting, from the information from the one or more mobile devices, an identity of the venue.

20. The method of claim 15, further comprising identifying the venue by comparing the one or more locations of the one or more mobile devices within the venue to a map.

21. A method of providing information for a determination of venue-specific wireless access point location data, the method comprising:
- detecting, with a wireless communication interface, a plurality of wireless access points at a location within a venue, wherein:
  - the mobile devices determines a threshold number of the plurality of wireless access points are associated with the venue, or
  - at least part of an identity of each of the plurality of wireless access points is the same for all of the plurality of wireless access points, wherein the identity of each of the plurality of wireless access points is obtained from data broadcast by the respective access point;
- in response to detecting the plurality of wireless access points, sending, via the wireless communication interface to a server, information indicative of:
  - the identity of at least one of the plurality of wireless access points, and
  - the location within the venue at which the plurality of wireless access points were detected; and
- further sending, via the wireless communication interface to the server:
  - an indication of an identity of the venue with which the threshold number of the plurality of wireless access points are associated, or
  - the at least part of the identity of each of the plurality of wireless access points that is the same for all of the plurality of wireless access points,
  - or both.

22. The method of claim 21, further comprising determining a location of the at least one of the plurality of wireless access points.

23. The method of claim 22, further comprising determining the location of the at least one of the plurality of wireless access points using RSSI measurements, or RTT measurements, or both.

24. The method of claim 22, further comprising sending, via the wireless communication interface to the server, information indicative of the determined location.

25. The method of claim 21, further comprising sending, via the wireless communication interface to the server, information indicative of RSSI measurements, or round trip time RTT measurements, or both, related to the at least one of the plurality of wireless access points.

26. The method of claim 21, further comprising sending the information:
- when location measurements are obtained,
- at a scheduled time or time period,
- upon receiving a request from the server, or
- upon establishing a Wi-Fi data connection, or
- any combination thereof.

27. The method of claim 21, further comprising, prior to sending the information indicative of the identity of at least one of the plurality of wireless access points, determining a distance of the at least one of the plurality of wireless access points.

28. The method of claim 27, further comprising determining the distance of the at least one of the plurality of wireless access points by determining whether an RSSI measurement is below an RSSI threshold value, or an RTT measurement is above an RTT threshold value, or both.

* * * * *